Sept. 5, 1933.  F. H. HOPKINS  1,925,323
POP SAFETY VALVE
Filed Aug. 7, 1930   2 Sheets-Sheet 1
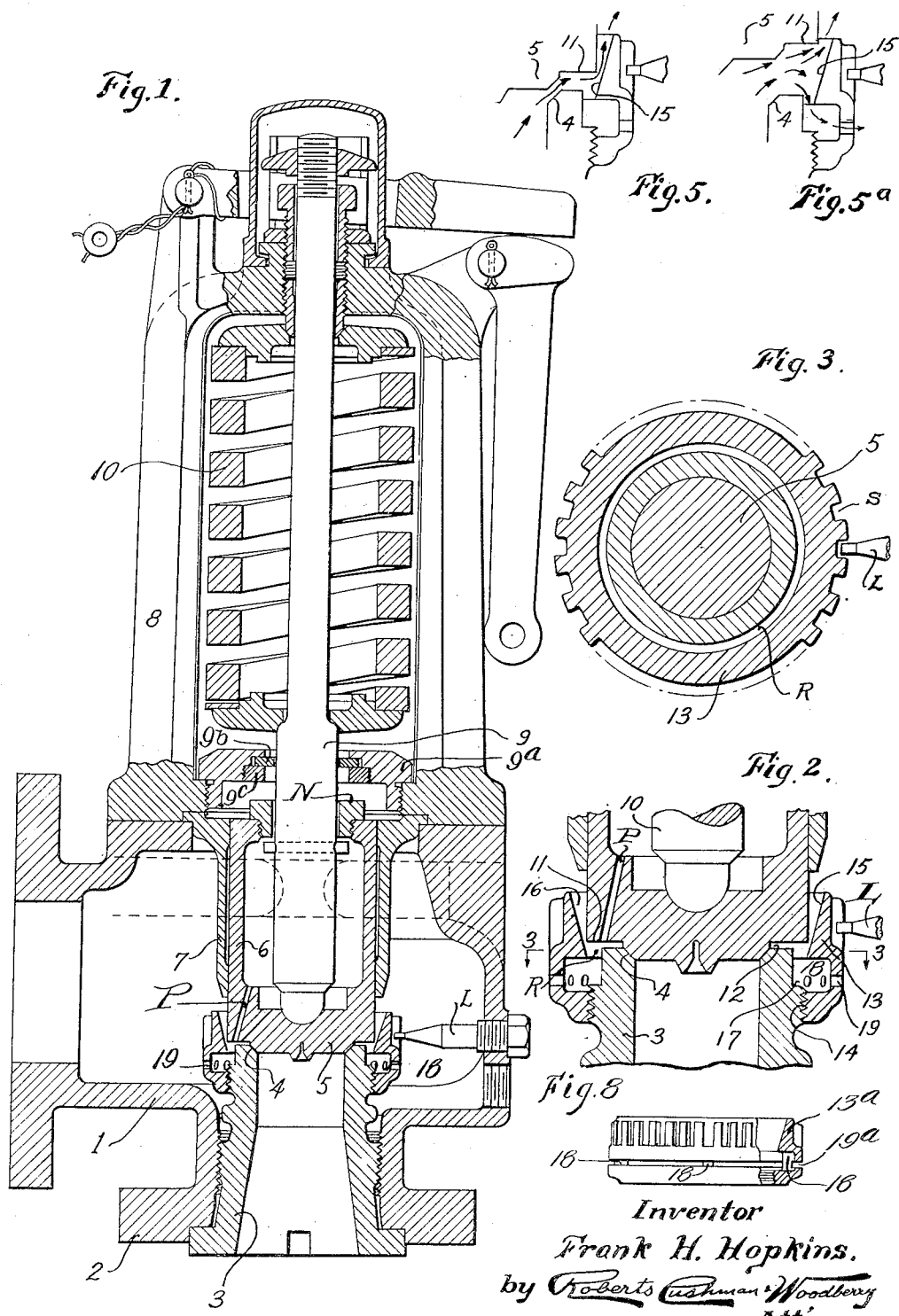
Inventor
Frank H. Hopkins.
by Roberts Cushman Woodberry
Attys.

Sept. 5, 1933.  F. H. HOPKINS  1,925,323
POP SAFETY VALVE
Filed Aug. 7, 1930  2 Sheets-Sheet 2

Inventor
Frank H. Hopkins.
By Roberts Cushman & Woodbury
Attys.

Patented Sept. 5, 1933

1,925,323

UNITED STATES PATENT OFFICE 1,925,323

POP SAFETY VALVE

Frank H. Hopkins, Bridgeport, Conn., assignor to Consolidated Ashcroft Hancock Company, New York, N. Y., a corporation of Delaware Application August 7, 1930. Serial No. 473,561

14 Claims. (Cl. 137—53)

This invention pertains to spring loaded safety valves such as are employed upon steam boilers, superheaters, compressed air tanks, oil stills, etc., and relates more particularly to improvements providing a valve wherein the valve disk or feather will rise from its seat to full lift, and will close sharply without exceeding the allowable blow-down, and wherein this desirable result is attained by the use of few and simple parts, including, for example, a single adjustable element. In modern engineering practice, where very high pressures often are encountered and where safety valves must be designed to deliver large volumes of the pressure fluid, it is highly desirable, in order to avoid undue multiplication of valves or excessive size in the valve parts, to have the valve open substantially to full capacity and this under ordinary conditions, necessitates a high lift of the feather or valve disk from its seat. On the other hand, it is desirable that the valve pop or open sharply and without prolonged simmer and that it close abruptly when the pressure has fallen to a predetermined blow-down point. The latter requisite is especially important in view of the insistent demand of users, and of the engineering profession, that the blow-down be kept as low as possible, a 2% blow-down often being considered as a permissible minimum.

Various attempts have heretofore been made to attain the desired accuracy of operation both at opening and closing with the high lift desired, but it is well known by valve engineers that the higher the opening or lift of a pop valve disk, the more difficult it becomes to keep the blow-down within the desired range. For the intended purpose it has variously been proposed to provide a valve seat and valve disk having opposed surfaces of special design; to provide exterior casings, shields, controllable delivery outlets, chambers, etc. for the pressure fluid escaping from beneath the valve; and it has also been suggested that two or more adjusting rings might be used, one for controlling the blow-down and the other to control the pop or opening, but except for the latter proposal, which involves complication of parts and great care in obtaining a proper adjustment of the several rings, such prior suggestions, so far as known to me, have failed to result in a practical valve having the desired characteristics.

The best results up to the present time, so far as I am aware, and particularly where high lift is not so essential, have been obtained by the use of a vertically adjustable blow-down ring and by providing the feather or valve disk with an overhang or roof providing a chamber commonly known as a "huddling" chamber which opens peripherally into a narrow annular space between the edge of the roof and the inner surface of the blow-down ring. With this arrangement, the least lift of the valve from its seat allows pressure fluid (hereinafter referred to for convenience as "steam") to enter the huddling chamber where the pressure builds up and, acting upon the overhanging roof of the chamber, assists the pressure beneath the valve disk proper to raise the valve to its full lift against the constantly increasing resistance of the loading spring. In order that the pressure in the huddling chamber may build up to the desired extent, it is essential that the peripheral delivery vent from the huddling chamber shall not exceed a predetermined capacity, as otherwise the valve will simmer and fail to open properly until the boiler pressure for which the valve is set is substantially exceeded, and for high lift it is common to extend the roof or overhang so as to obtain the requisite pressure area. However, there is a limit to which the increased area of the disk outside of the seat may be carried in an effort to obtain greater lifts, since the peripheral delivery orifice whose inner edge is defined by the edge of the overhang is thereby so increased in diameter that it can not be controlled by a ring of standard size and, if the ring be increased in diameter to provide a delivery orifice of the necessary area, there comes a point where it is so far away from the valve seat that the valve will not open without prolonged simmer.

In accordance with the present invention I provide a single blow-down ring, preferably adjustable to permit setting the valve for different blow-downs, whose inner surface diverges upwardly and outwardly away from the plane of the valve seat so as to provide an outlet of increasing capacity as the valve lifts, and I provide the valve disk with an overhang or roof calculated to give the desired lift, the roof being without the downwardly directed lip sometimes found in valves of this type, so that the steam tends to flow radially out from below it. In order to take care of the full volume of steam when the valve is wide open, but without unduly increasing the diameter of the blow-down ring, I provide auxiliary passages leading downwardly and outwardly from the huddling chamber which, in effect, increase the orifice for discharge of steam at full opening. With this arrangement, when the valve first rises from its seat, the kinetic energy of the escaping steam is converted into pressure energy, due to the fact that the steam must change its direction in passing from the valve seat outwardly toward the annular peripheral orifice between the ring and the feather. At the beginning of the opening movement, the change in direction necessary to permit the steam to escape between the ring and roof is less than that necessary for the steam to escape through the auxiliary passages and but little steam passes out through the latter, so that the building up of the requisite opening pressure in the huddling chamber is not substantially affected by the presence of such passages, but when the valve is fully open, pressure builds up between the under surface of the valve as a whole and the valve seat area so that the steam from this pressure space flows outwardly in any direction available and thus the auxiliary passages become effective to increase the discharge orifice. With this arrangement the upper edge of the blow-down ring may be disposed so near to the edge of the valve disk as to provide the desired accuracy of blow-down control while at the same time, when the valve is closed, the annular peripheral vent from the huddling chamber is sufficiently narrow to ensure proper opening without simmer. Preferably, as shown, the auxiliary passages are formed in the adjustable blow-down ring itself so that the location of such passages with respect to the lip of the adjustable ring is invariable; thus the blow-down ring may be adjusted at will without necessitating other and compensatory adjustments of the auxiliary passages such as might be required if the latter were formed in a fixed part of the valve structure. Moreover the provision of the auxiliary passages in the ring facilitates manufacture and permits existing valves to be modified readily to obtain the advantages of the present invention.

Valves constructed in this manner have proven in practical use and under competitive tests to provide greater accuracy of opening and closing than any valve heretofore known to me. Thus, for example, a three inch valve of this type was found to pop without simmer at substantially the exact pressure desired and to close sharply with a blow-down of approximately 2%.

In the accompanying drawings I have illustrated one desirable embodiment of my invention by way of example and in the drawings;

Fig. 1 is a vertical section, partly in elevation, illustrating a valve of one desirable type having my improvements embodied therein;

Fig. 2 is a fragmentary vertical section to larger scale showing the valve seat, blow-down ring and adjacent parts;

Fig. 3 is a horizontal section substantially on the line 3—3 of Fig. 2;

Figure 6:
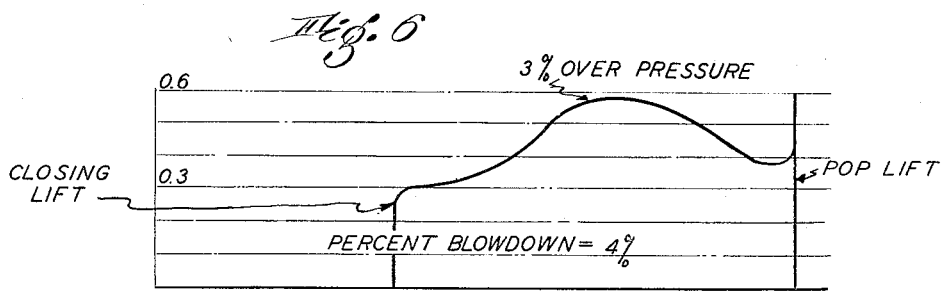
Figure 7:
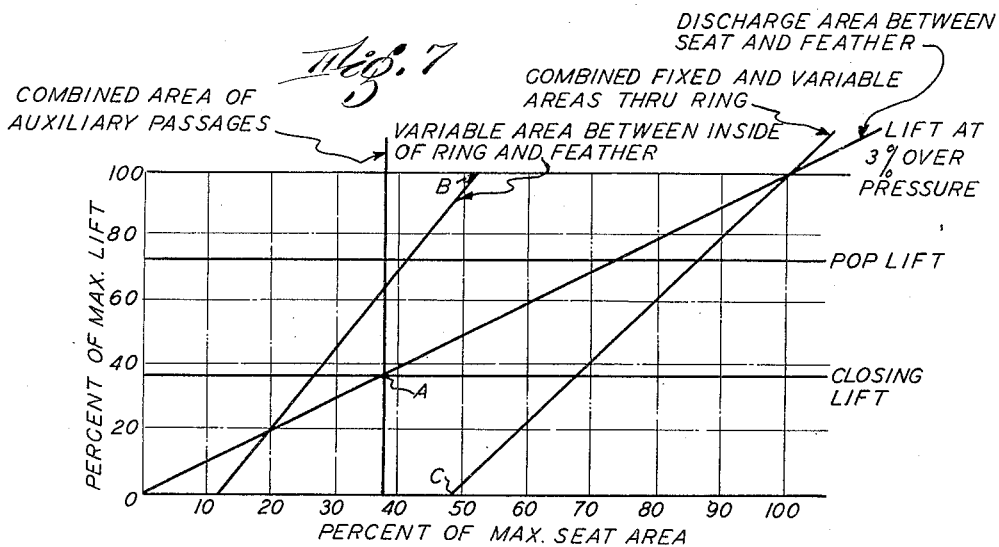

Figs. 5 and 5ª are fragmentary diagrammatic views illustrating the probable action of the steam when the valve begins to open and when the valve is fully open, respectively;

Fig. 6 is a duplicate of an actual lift card illustrating the valve action at 3% over pressure;

Fig. 7 is a graphic chart indicating the corelation of the various factors effecting the valve movements; and Fig. 8 is a vertical section of a modified form of blow-down ring.

Referring to the drawings, the numeral 1 designates the valve body, usually a casting or forging, having the base or attaching flange 2. As here illustrated this body is provided with a bushing 3 of the general type described and claimed in the patent to Graesser et al., No. 1,668,453, dated May 1, 1928, and which is provided at its upper end with the annular bevelled valve seat 4. The valve disk or feather 5 normally bears upon the seat 4 to close the passage through the valve body, and as illustrated, the valve disk or feather is provided with a substantially cylindrical hollow skirt portion 6 which slides within a fixed cylindrical guide 7 secured within the body 1 of the valve. The valve is provided with a top 8 which supports a guide for the upper end of the spindle 9 and an adjustably fixed abutment for the upper end of the valve loading spring 10, and the spindle is furnished with a rounded shoulder at an intermediate point for engagement by a lower abutment collar supporting the lower end of the spring 10.

A cover device 9ª, secured in the lower part of the valve top, prevents free access of steam to the spring said cover device having a central opening axially aligned with the valve seat. Preferably the cover comprises a laterally movable annulus 9ᵇ of any suitable material, and having a central opening adapted to receive the spindle. This annulus permits slight lateral movement of the spindle and may be associated with the cover proper in any suitable way, for example by seating it in a recess in the underside of the cover and confining it in the recess by means of a screw-threaded ring 9ᶜ. The cover 9ª is so disposed with reference to the lower abutment collar as not to interfere with the proper seating of the valve.

The upper end of the cylindrical skirt portion 6 of the valve is preferably provided with a valve-lifting nut N and the lower part of the spindle 9 passes down through a central opening in this nut and into the chamber within the skirt 6 of the valve. The lower end of the spindle 9 is spherically curved and adapted to seat in a correspondingly shaped cup or socket in the upper surface of the valve feather 5.

Referring more particularly to Fig. 2, I prefer to provide the valve disk or feather with an overhang or roof 11 spaced from the upper end of the bushing 3 so as to provide a space 12 of the kind commonly known as a "huddling chamber". Preferably, one or more passages P lead from the interior of the hollow skirt 6 to the huddling chamber, preventing any substantial accumulation of condensed steam in the chamber within sleeve 6.

As illustrated, the under surface of the overhang or roof 11 is substantially horizontal and is devoid of the downwardly directed lip which has sometimes been used in valves of this type. As thus arranged, steam escaping from over the valve seat tends to flow radially outward from beneath the roof or overhang 11. In order to control the valve in its opening and closing movements I provide a single blow-down ring 13 concentric with the valve seat. Preferably, in order that the valve may be adapted for use with different pressures or to give a different per cent blow-down, I make this ring 13 adjustable, as for example by screw threading it to the bushing 3 at the point 14 so that by turning the ring it may be adjusted vertically. Preferably the outer surface of the ring is provided with a series of slots S adapted for the reception of the inner end of a locking screw L having threaded engagement with an opening in the wall of the casing 1. In adjusting the ring, this screw is first retracted, the ring is then turned, and the screw then advanced to engage one of the slots S so as to lock the ring in its new position.

Preferably the inner surface 15 of the ring 13, at that portion which is opposite to the peripheral surface of the valve disk, is inclined upwardly and outwardly. As here shown, the face 15 is a bevelled or right conical surface, but I contemplate that this surface may be other than conical, for example of spherical curvature, and I further contemplate the possibility that desirable results may also be obtained by making the surface 15 cylindrical and suitably shaping the opposed surface of the valve disk so as in an equivalent manner to provide opposed surfaces divergent upwardly and outwardly relative to one another. The diverging surfaces of the valve disk and ring 13 thus provide a main annular steam discharge passage 16 of progressively increasing capacity. An auxiliary steam discharge passage of fixed area, leading downwardly from the huddling chamber is provided as follows.

At a point above the screw threads 14, the bushing 3 is provided with a peripheral recess 17 which is opposed to a recess 18 in the inner surface of the ring 13, thus providing an annular chamber which communicates at R with the huddling chamber 12. The ring 13 is provided with one or more openings, preferably a series of openings 19 spaced at equal distances about the ring and leading outwardly from the annular chamber formed by the recesses 17 and 18.

With the arrangement just described it may be noted that the outer lower edge of the overhanging portion 11 of the valve disk is normally arranged close to the inner surface 15 of the blow-down ring 13 and that as the valve disk rises, the space between such lower edge of the valve disk and the inner surface 15 of the ring constantly increases.

Referring to Figs. 5 and 5a, I have illustrated what I apprehend to be the mode of operation of this valve in opening and when fully opened. Thus, as shown in Fig. 5, when the pressure rises sufficiently to raise the valve disk very slightly from its seat, the steam will flow outwardly over the edge of the seat into the huddling chamber through which it flows radially at high velocity until it strikes the inner surface 15 of the blow-down ring by which it is deflected upwardly and outwardly. This deflection of the steam converts a portion of its kinetic energy into pressure energy which, acting upon the large surface afforded by the overhang or roof 11, moves the valve disk quickly up to full lift. During the initial upward movement of the valve, the high velocity of the steam (at the valve popping pressure) flowing between the radial upper and lower surfaces of the huddling chamber is such that little if any steam flows down through the recess R and out through the openings 19. In fact I believe it quite possible, by reason of the rapidly increasing discharge area afforded by the sloping wall 15 that at the point where the downwardly directed recess R leaves the huddling chamber, there may even be an area of low pressure such as might tend to induce the flow of air inwardly through the passages 19. However, when the valve disk has reached its uppermost position, as shown in Fig. 5a, and steam in full volume, but at decreasing pressure, is flowing out and over the upper edge of the ring 15, the space beneath the valve disk proper, including its overhang 11, has become in a sense a part of the boiler and is characterized by a predominance of pressure effect rather than velocity effect, so that under these circumstances steam tends to flow outwardly in any available direction and thus a substantial amount passes downwardly and outwardly through the auxiliary discharge passage provided by the recess R and the openings 19. Thus under these conditions, the recess R and the openings 19 furnish an auxiliary outlet for the steam, thereby increasing the delivering capacity of the valve to such an extent that although the valve disk may be raised to full lift, it is not necessary to space the upper edge of the ring 13 excessively from the periphery of the valve disk to avoid throttling, and thus when the boiler pressure drops to the blow-down point, the blow-down ring functions, in the same way as in valves of low lift, so as accurately to control the closing.

Figure 4:
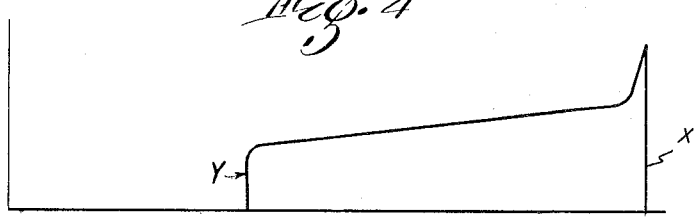
Fig. 4 is a lift card typical of the valve action at normal loading, showing the sharp opening and closing of the valve.

Thus, as indicated in the valve lift card of Fig. 4, when the pressure rises to the opening point, the valve opens sharply to its full lift, as indicated at X, and possibly slightly above the desired maximum lift, as shown by the cusp at the right-hand side of the lift diagram. As the pressure gradually decreases due to the blowing of the valve, the valve closes sharply as indicated at Y in the diagram and without substantial tendency to hang up and cause abnormal blow-down, the sudden closing being facilitated by the action of the auxiliary passages which relieve the pressure in the huddling chamber at the lower pressure of valve closing. With this construction, it is readily possible to adjust the valve, even when used under conditions of high pressure, so that it will close sharply and within the desired minimum blow-down, while at the same time the valve opens quickly to its full capacity without simmer or chatter.

When as shown in Fig. 6, the valve is adjusted for over-pressure, according to the usual practice upon which safety valve capacity is based, a maximum lift is obtained beyond the pop lift, but the valve closes with the same sharpness as is indicated in Fig. 4.

In Fig. 7, the per cent of maximum lift is plotted as ordinates with reference to per cent of maximum seat area plotted as abscissæ, and it will be noted that when the area for steam discharge between the valve feather and its seat equals the fixed area represented by the aggregate of the auxiliary escape passages 19, combined with the variable area between the surface 15 of the ring 13 and the circumferential surface of the valve feather, a maximum lift is obtained, and that as the feather returns toward its seat it closes abruptly when the area between the feather and its seat becomes substantially equal to the fixed area through the escape passages 19, that is to say, when the steam discharging beneath the valve feather can all escape through the passages 19, it being noted that after the drop in pressure due to blowing, the steam escaping from below the valve disk no longer possesses the same kinetic energy as at opening. Thus as the loading spring returns the valve toward its seat, there is no possibility of trapping steam in the huddling chamber so as to hold the valve open, and the valve closes sharply.

I am aware, as above referred to, that pop valves have heretofore been proposed, wherein the valve disk is provided with a depending peripheral flange which produces a downward discharge of the pressure fluid and having auxiliary discharge passages leading from the huddling chamber. But in all such devices it is evident that the flow of the escaping pressure fluid is in the same general direction as these auxiliary passages, so that upon the least lift of the valve from its seat the pressure fluid begins to discharge through the auxiliary passages. Thus these passages, in prior constructions must necessarily affect the operation of the huddling chamber, and I apprehend that in such devices a prolonged simmer must necessarily result. On the other hand in the present arrangement, wherein the valve disk has no depending lip, and the pressure fluid discharges radially and then upwardly, the auxiliary passages are apparently without substantial effect until the valve has safely opened to its full capacity, at which time they become effective to increase the total discharge area, thus making it unnecessary to space the blow-down ring so far from the valve disk as to make it unreliable in controlling the valve closure.

In describing the construction herein illustrated, I have made frequent use of the expressions "vertically" and "up and down" as conveniently describing the relations of parts or of the flow of the pressure fluid, but it is to be understood that these terms have been used merely with reference to the illustrated embodiment of the invention in a vertically upright valve, and that they are to be understood merely as descriptive and not as limiting the invention in these respects. I have also referred to "steam" as the pressure fluid, for convenience in description, but without any intent to limit the use of the valve for controlling steam pressures. I further contemplate that various changes in shape and proportion of parts and the substitution of equivalents may be made without departing from the spirit of the invention, and wish particularly to point out, if the valve seat be integral with the valve casing 1 or otherwise supported, that the blow-down ring and other associated parts will be arranged in a correspondingly appropriate manner. Thus, for example, as illustrated in Fig. 8, the blow-down ring 13ª may have circumferential elongate slots 19ª reaching from the recess 18 instead of the circular holes shown in the preceding figures.

I claim:

1. A pop safety valve having a valve seat, a valve disk cooperating with the seat and so designed as to provide a huddling chamber having a peripheral outlet, means for loading the valve disk, and a single adjustable deflector member having an operative surface, so spaced from the valve disk as accurately to control both popping and blow-down, said deflector cooperating with the valve disk to define a main discharge passage, said adjustable deflector member having therein an auxiliary discharge passage, operative when the valve is blowing, to deliver a portion of the escaping pressure fluid from the huddling chamber.

2. A pop safety valve having a valve seat, a valve disk cooperating with the seat and so designed as to provide a huddling chamber normally open peripherally throughout substantially its entire height, means for loading the valve disk, means cooperating with the valve disk to define a diverging main discharge passage leading radially out from the outer edge of the huddling chamber, and means providing an auxiliary passage leading downwardly from the huddling chamber.

3. A pop safety valve having a valve seat, a valve disk having an overhang whose under surface is substantially plane and radial and which forms the upper wall of a huddling chamber, and a vertically adjustable annulus concentric with the valve seat, said annulus having an upwardly and outwardly inclined inner surface cooperating with the valve disk to define a main discharge passage of progressively increasing capacity leading from the huddling chamber, said annulus having therein an auxiliary discharge passage of constant capacity leading from the huddling chamber.

4. A pop safety valve having a valve seat, a valve disk cooperating with the seat and so designed as to provide a huddling chamber whose upper and lower surfaces are substantially parallel and which is unobstructed peripherally, means for loading the valve disk, means cooperating with the valve disk to provide an annular main discharge passage increasing in width upwardly from the outer edge of the huddling chamber, and means providing an annular auxiliary escape passage leading downwardly from the huddling chamber, the huddling chamber and passages being so relatively arranged that as the valve first begins to move away from its seat, the inner end of said auxiliary passage is subject to low pressure.

5. A pop safety valve having a valve seat, a valve disk cooperating with the seat and so designed as to provide a huddling chamber freely open at its peripheral edge, means for loading the valve disk, an adjustable ring concentric with the valve seat, said ring having an upwardly extending portion cooperating with the valve disk to define a main discharge passage leading outwardly and upwardly from the huddling chamber, the ring having an annular recess cooperating with the valve body to define an auxiliary discharge passage leading from the huddling chamber, the ring also having a delivery orifice leading outwardly from said auxiliary discharge passage.

6. A pop safety valve having a valve seat, a valve disk cooperating with the seat and so designed as to provide a huddling chamber, means for loading the valve disk, an adjustable annulus concentric with the valve seat, said annulus extending above the valve seat and providing an upwardly and outwardly inclined wall cooperating with the valve disk to define a main discharge passage of progressively increasing capacity, the annulus having an annular recess extending downwardly below the valve seat to provide an auxiliary discharge passage leading from the huddling chamber, the annulus also having a plurality of discharge orifices leading radially outward from said recess.

7. A pop safety valve having a body provided with a valve seat, a valve disk cooperating with the seat and so designed as to provide a huddling chamber, means for loading the valve disk, a vertically adjustable ring having screw-threaded engagement with the valve body, said ring having an annular flange spaced from the edge of the valve disk to provide a main discharge passage, the opposed surfaces of the disk and flange being relatively divergent whereby to provide a passage of progressively increasing area uniting at its smaller end with the huddling chamber, the ring and valve seat having registering spaced recesses defining an annular passage leading downwardly from the huddling chamber, the ring having orifices leading radially outward from said annular passage.

8. A pop safety valve having a valve seat, a valve disk cooperating with the seat, the valve seat and disk being so designed as to provide a huddling chamber, and a vertically adjustable ring cooperating with the disk to define a main discharge passage whose area varies as the valve lifts from its seat, said ring having therein an auxiliary passage of fixed area, said passages leading from the huddling chamber, the parts being so constructed and arranged that the valve opens to maximum lift when the combined fixed and variable discharge areas substantially equal the delivery area between the valve and its seat.

9. A pop safety valve having a valve seat, a valve disk cooperating with the seat, the valve seat and disk being so designed as to provide a huddling chamber, and an adjustable blow-down ring cooperating with the valve disk to define a main discharge passage whose area varies as the valve lifts from its seat, said ring having therein an auxiliary passage of fixed area, said passages leading from the huddling chamber, the parts being so constructed and arranged that the valve closes sharply when the pressure has been reduced to a predetermined point after blowing and the delivery area between the valve and its seat has become equal to the area of the auxiliary discharge passage.

10. A pop safety valve having a valve seat, a valve disk cooperating with the seat, means for loading the valve, the valve having an overhang providing a huddling chamber freely open at its periphery, a blow-down ring having its inner surface so shaped and related to the edge of the valve disk as to ensure opening of the valve without simmer and to provide an increasing area for steam discharge as the valve opens, and means providing an auxiliary discharge passage of fixed area leading from the huddling chamber and effective to discharge pressure fluid from the huddling chamber only after the valve is freely open thereby permitting disposal of the upper edge of the blow-down ring so near to the periphery of the valve disk as to ensure accurate blow-down without throttling the valve at full lift.

11. A pop safety valve having a valve seat, a valve disk cooperating with the seat, the seat and disk being so designed as to provide a huddling chamber, and a blow-down ring cooperating with the valve disk to define a main discharge passage whose area varies as the valve lifts from its seat, said ring having therein an auxiliary discharge passage of fixed area which becomes effective only when the valve is substantially fully open, the parts being so constructed and arranged that the valve reaches full lift at blowing pressure when the discharge area between the valve and its seat substantially equals the combined areas of the main and auxiliary passages, and abruptly closes at a predetermined lower pressure when the discharge area between the valve and seat substantially equals that of the auxiliary discharge passage alone.

12. A pop safety valve having a valve seat, a valve disk cooperating with the seat, the seat and disk being so designed as to provide a huddling chamber, and an adjustable blow-down ring cooperating with the valve disk to define a main discharge passage whose area varies as the valve lifts from its seat, said ring having therein an auxiliary discharge passage of fixed area, the parts being so constructed and arranged that when the valve is open to provide substantially 100% discharge area it has lifted substantially 100% of its total lift, and that when the pressure has dropped due to blowing the valve closes abruptly when the discharge area and the lift have decreased substantially to 38% of their respective maxima.

13. A pop safety valve having a casing housing, a valve seat, a valve disk cooperating with the seat, the disk having an overhang so designed as to provide a huddling chamber freely open at its periphery, and means comprising a blow-down ring providing a main discharge passage whose area varies as the valve lifts from its seat, the valve having an auxiliary discharge passage of fixed area leading from the huddling chamber, the parts being so constructed and arranged that at blowing pressure the valve attains substantially 100% lift simultaneously with its opening to substantially 100% of its full capacity, and closes abruptly after blowing when the lift and discharge areas have been reduced substantially to 38% of their maxima respectively.

14. A high lift pop safety valve of the kind having a casing provided with a valve seat, a movable valve member cooperable with the seat and so designed as to provide a huddling chamber freely open at its periphery, and a blow-down ring concentric with the valve seat, said blow-down ring having an outwardly flaring inner surface whose lower part is so near to the movable valve member when the latter is seated as to ensure popping without substantial simmer and which deflects the pressure fluid escaping from the huddling chamber in a radially divergent stream, the discharge passage between the inner surface of said ring and the movable valve member being of insufficient maximum capacity to deliver all of the pressure fluid escaping over the valve seat at full lift, and means providing a constantly open auxiliary discharge passage from the huddling chamber, said auxiliary passage leading from the huddling chamber at such an angle that the pressure fluid is deflected away therefrom, when the valve begins to open, by the inner surface of the ring and does not tend to enter such auxiliary passage until the valve is substantially wide open.

FRANK H. HOPKINS.